July 7, 1936.  P. L. ALGER  2,046,992
DYNAMO-ELECTRIC MACHINE
Filed Nov. 27, 1929
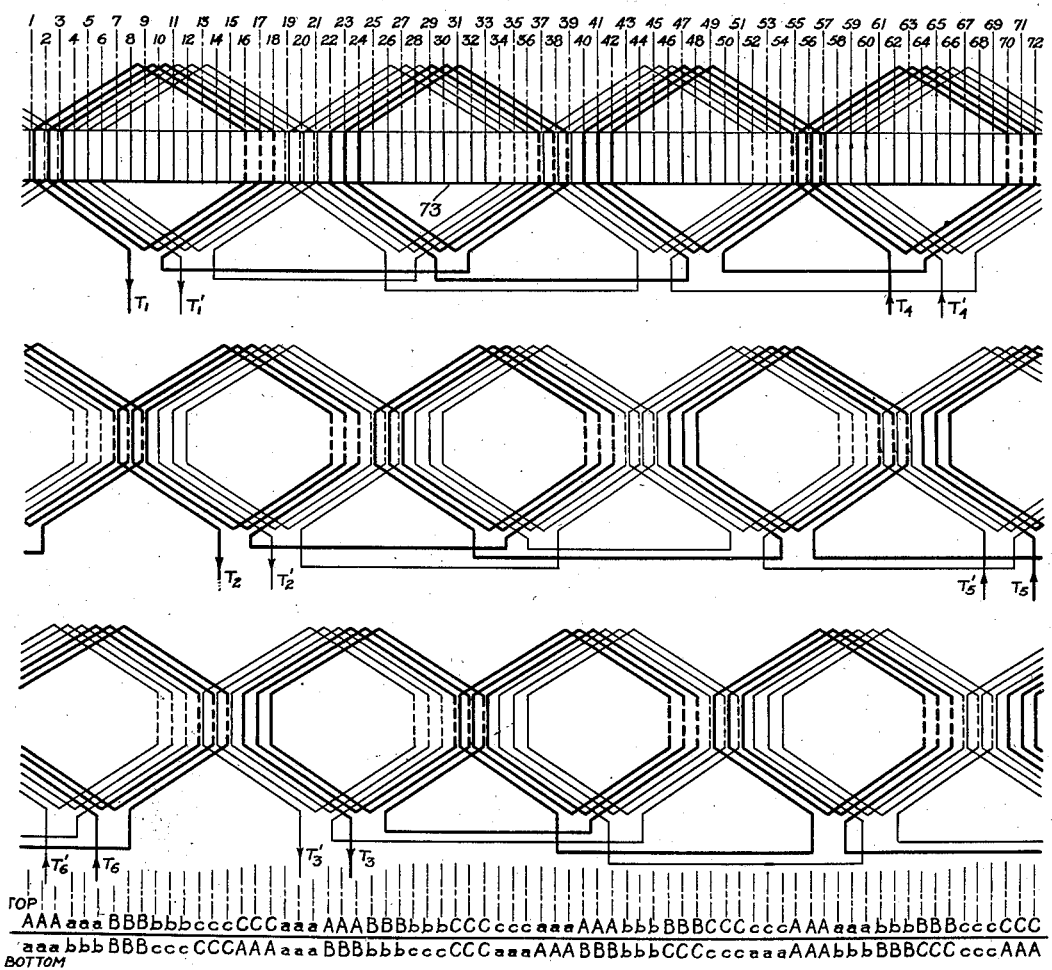
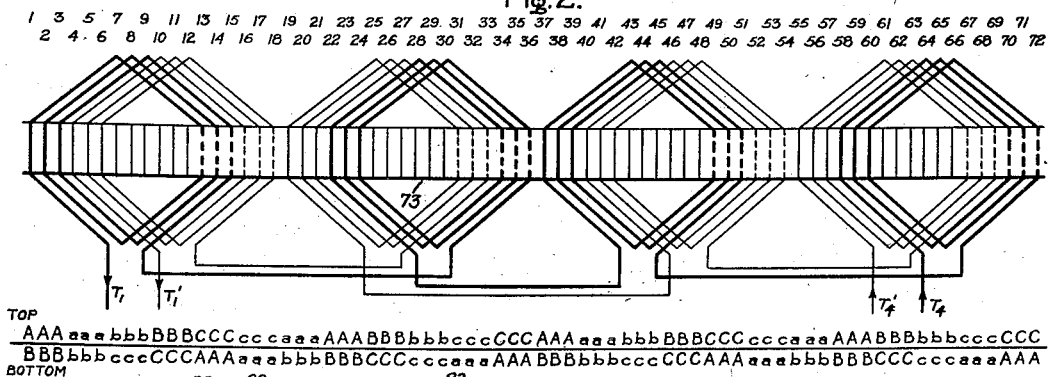
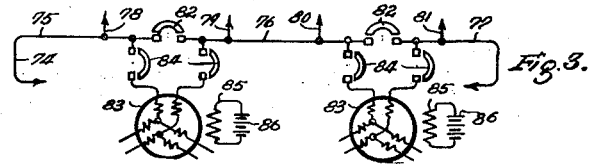
Inventor:
Philip L. Alger,
by Charles V. Mulla
His Attorney.

Patented July 7, 1936

2,046,992

UNITED STATES PATENT OFFICE 2,046,992

DYNAMO-ELECTRIC MACHINE

Philip L. Alger, Schenectady, N. Y., assignor to General Electric Company, a corporation of New York Application November 27, 1929, Serial No. 410,209

15 Claims. (Cl. 171—206)

My invention relates to dynamo-electric machines and more particularly to armature windings for alternating current dynamo-electric machines.

A very recent and important development in dynamo-electric machine design, particularly in regard to armature windings for large steam turbine-driven alternators, is the use of two electrically independent windings on the same stator core. By loading the windings independently, the advantages of a higher generator reactance and hence lower fault currents are obtained, while yet retaining adequate synchronizing power between the synchronous machines of a central generating station or system. Also, by connecting the windings to adjacent bus sections of a sectionalized ring bus, as described and claimed in United States Letters Patent No. 1,815,823, granted July 21, 1931, upon an application of Theophilus F. Barton, the bus sections are effectively separated by a high "through" reactance; thus limiting the current flow on faults, while still permitting power flow between bus sections, by virtue of the transformer action between the two windings. These characteristics of dynamo-electric machines equipped with electrically independent circuits permit the elimination of bus reactors and a reduction in required circuit breaker capacity so that the double winding generator has become an important element of central generating stations and substations in systems of electrical distribution.

Multiple circuit armature windings have been commonly used for many years to reduce the currents the individual conductors are required to carry, but the circuits are not suitable for independent loading, since any inequality of circuit currents normally gives rise to an irregular flux distribution, causing extra power losses and abnormal mechanical stresses. A type of winding which is particularly suitable for the above mentioned purposes has been described and claimed in United States Letters Patent No. 1,815,832, granted July 21, 1931 upon an application of Delmar D. Chase. With this winding, the two independently loaded circuits lie in alternate slots or alternate groups of two or more slots, with no two coil sides of different circuits lying in the same slot. This arrangement gives approximate magnetic symmetry with unequal loading but it has been found that the transfer reactance is reduced by saturation under excessive fault currents. That is, when power is transferred from one winding to another, the slot leakage flux saturates the roots of the stator teeth. On this account, the leakage reactance limiting current transfer on short circuits is reduced by saturation and requires the use of larger generator reactors.

It is an object of my invention to provide an improved type of multiple winding for dynamo-electric machines which comprises a plurality of electrically independent similar armature circuits, each of which may be wound for different voltages or a different number of phases, and so arranged that any circuit may be satisfactorily operated alone, or if desired all circuits may be operated simultaneously as independent circuits or connected in parallel when said parts are exactly similar for operation as a single multiple circuit winding.

Another object of my invention is to provide an improved winding for alternating current generators which consists of two circuits, each of which when connected to different external circuits can supply equal or unequal loads to said external circuits without causing noticeable mechanical or magnetic unbalance in the generator, and in which the circuits are magnetically coupled in a manner to introduce reactance between the separate circuits and permit power flow with a minimum degree of saturation in the stator teeth under fault conditions.

Although my invention, in one of its immediate commercial applications, is particularly suitable for use in connection with synchronous generators for interconnecting adjacent bus sections of sectionalized busbars in central generating stations or substations as described and claimed in the aforementioned Barton patent, and although the general features hereinbefore outlined and the following description are directed in certain instances to this particular application it will be apparent to those skilled in the art that my invention is of general application to generators and motors in other systems of distribution, and in particular to motors designed for starting on full voltage, using one circuit only for starting and both circuits for normal operation as described and claimed in my application for United States Letters Patent, Serial No. 431,322, filed February 25, 1930 and assigned to the assignee of the present application.

It is a further object of my invention to provide an improved arrangement of apparatus and circuits in interconnected systems of electrical distribution and busbar systems of central generating stations or sub-stations for improving the control and stability of such systems. A simple embodiment of my invention for a double winding generator having the standard stator structure comprises a winding arrangement in which each phase belt is divided into two approximately equal portions, of which one is assigned to each independent circuit, and the sequence of half phase belts in each circuit is so selected as to give perfect circuit and phase balance, while minimizing the number of slots carrying coil sides of different circuits. The term "phase belt" as usually employed in single circuit machines designates the group of conductors, or coil sides, belonging to one phase and corresponding to one pole. Similarly, as applied to the multiple circuit winding of my invention the term "phase belt" throughout the specification and claims designates the group of conductors of the different circuits belonging to similar phases and corresponding to one pole. Thus the conductors of a two-circuit or multiple-circuit machine belonging to one phase of any given circuit and corresponding to one pole occupy half phase belts or fractional phase belts when considered with reference to a phase belt of the machine as a single circuit machine. To secure electrical balance, i. e. voltages of equal magnitude and time phase, between similar circuits the total number of slots in the machine should be sub-divided into as many groups as there are circuits desired and the slots in each group should be assigned between successive phase belts in the same manner as would be done for any irregular winding of a machine having the same number of phases and the same total number of slots. If there are $n$ circuits and the number of slots are such that an equal or substantially equal division between the respective circuits is permissible all the coil sides of the respective circuits in the same layer of each phase belt may be arranged in different groups of adjacent slots for $1/n$th of a phase belt or substantially $1/n$th of a phase belt. In the event that an equal or substantially equal sub-division of slots between the respective circuits is not permissible the assignment of slots per phase belt to the respective circuits may be different but the arrangement should be such that the total slots per phase per circuit is substantially the same in each of the plurality of circuits. Within the limitations of assignment of slots to the successive phase belts in a particular circuit under the above requirements, there are possible several sequences of assignment of the slots to the different circuits, and these sequences must be so chosen as to secure the desired alignment of coil sides of the same circuit in the same slots. This type of winding I designate as a "split belt" winding. Although my "split belt" winding is less symmetrical than the alternate slot type of winding as described and claimed in the aforementioned patent of Delmar D. Chase, I have found by calculations and tests that the additional stray losses and mechanical forces resulting are of little importance, and that the decreased saturation of the "through" reactance flux leakage paths obtained, is of great value.

While the simple alternate pole connection commonly used in multiple circuit machines could be used in place of the more complicated "split belt" connection, in dividing the coils into two independent circuits, I have found that the alternate pole connection has disadvantages which very seriously impair its usefulness. With the alternate pole connection, there is very little saturation of the "through" reactance leakage paths under excessive fault currents, but the localization of the end winding currents of a single circuit into one instead of two groups per pair of poles, gives rise to large stray losses during operation with unequally loaded circuits. Also, the dissymmetry of the armature reaction of a single circuit of an alternate pole winding gives additional stray losses and gives rise to subsynchronous speed tendencies in motors. By careful investigation and study I have found that the "split belt" winding combines the principal advantages of the alternate slot and alternate pole windings, while avoiding their disadvantages.

My invention will be better understood from the following description taken in connection with the accompanying drawing and its scope will be pointed out in the appended claims.

In the drawing, Fig. 1 is a diagrammatic development on a plane surface of a ⅝ pitch winding comprising two independent three-phase circuits embodying my invention, Fig. 2 is a similar diagrammatic development of a ⅔ pitch winding showing one phase of the two independent similar phase circuits for a three-phase machine, and Fig. 3 is a diagrammatic view of apparatus and circuits embodying my invention in a sectionalized busbar system.

Referring to Fig. 1 of the drawing, I have here diagrammatically represented a two-layer lap winding for a four-pole, two-circuit, three-phase alternator. There are in this particular instance 72 slots numbered accordingly, with fractional pitch coils of ⅝ pitch, but it will be understood that my invention is not limited to any particular number of slots or particular coil pitch and may be used with full slot or fractional slot windings. For the purpose of more clearly showing the arrangement of coil sides of the respective phases, two of the similar phase circuits have been shown in spaced relation with respect to the stator core slots along the longitudinal axis of the stator core. The three phases of one circuit are shown in heavy lines and designated as A, B and C, while the three phases of the other circuit are shown in light lines and designated respectively as $a$, $b$ and $c$. The coil sides in the bottom of each slot are shown dotted. The free terminals of phases A, B and C are designated as $T_1$, $T_2$, and $T_3$, respectively, while the common terminals or neutral ends of the different phases in the order named are designated as $T_4$, $T_5$, and $T_6$ respectively. Similarly, the free terminals of $a$, $b$ and $c$ are designated as $T_1'$, $T_2'$, and $T_3'$ respectively, while the common terminals or neutral ends are designated as $T_4'$, $T_5'$ and $T_6'$ respectively. Phase A is thus identified as $T_1$—$T_4$, phase B as $T_2$—$T_5$ and phase C as $T_3$—$T_6$. Similarly phase $a$ is identified, as $T_1'$—$T_4'$, phase $b$ as $T_2'$—$T_5'$ and phase $c$ as $T_3'$—$T_6'$. The common terminals $T_4$, $T_5$ and $T_6$, and $T_4'$, $T_5'$ and $T_6'$ may be connected in a manner to connect the respective circuits in star or delta as desired.

In Fig. 1 of the drawing 73 represents the core for the armature winding which in practice would ordinarily be the stator member similar in construction to the stator of a standard alternating current dynamo-electric machine, which as well known in the art consists of a laminated core slotted to receive the winding. A convenient way to analyze the winding arrangement is to consider that each of the full phase belts of the ordinary single circuit winding is split into two approximately equal parts, one part being connected in one independent circuit, and the other part being connected in the other independent circuit. The split phase belt winding having an equal number of coils per belt per pole, per phase, may be used, as well as a fractional number of coils per phase per pole, the latter of course, being equivalent to different numbers of coils in the two belts of a given phase and pole. In windings embodying my invention particular attention must be given to the sequence of the half phase belts in order to obtain phase and circuit balance, as well as to obtain some of the top and bottom conductors of the same circuit in the same slot. It is not desirable merely to alternate the half phase belts of the two circuits, when the pitch is greater than ⅔, because conductors of different circuits would be contained in the same slots. The sequence of coil sides now believed to be preferable for two circuits utilizing coils having a pitch between ¾ and 1⅛, approximately, is a reversed order of coil sides of the respective circuits every two phase belts. Thus with the three phases, A, B, and C, and the three phases $a$, $b$, and $c$, each having three slots per pole per phase, per circuit, and ⅝ pitch, as illustrated in Fig. 1, the distribution of the phases in successive slots, using for simplicity one letter of the corresponding phase to represent the coil sides of one half a phase belt, is as follows:

Top layer—$AaBbcCaABbCcaAbBCcAabBcC$
Bottom layer—$abBcCAaBbcCaABbCcaAbBCcA$

It will thus be observed that in the top layer of the first two phase belts the order is the "capital letter" circuit, "lower case" letter circuit whereas in the next two phase belts the order is reversed, namely, "lower case" letter circuit, "capital letter" circuit. This order is maintained proceeding around the stator core or from left to right as viewed in the drawing. Similarly in the bottom layer the same order is preserved except that the first half belt to the left, as viewed in the drawing is taken with the last half belt to the right. Then beginning with the half phase belt of the bottom layer coil sides of the A circuit in slots 16 to 18 and proceeding around the stator core or from left to right as viewed in the drawing, the order of the first two phase belts is the "capital letter" circuit, "lower case" letter circuit and the order in the next two phase belts is reversed, namely, "lower case" letter circuit, "capital letter" circuit. The distribution of phases in successive slots is indicated in detail at the bottom of Fig. 1 by the respective phase letter designations in line with the dash dot lines indicating the center lines of the various slots. Although I have not differentiated the phase belts carrying oppositely directed currents in representing them by letters in this way, it is well known to those skilled in the art that the phase belts under adjacent poles are connected in reversed directions, and this alternation of direction is in fact indicated by the coil connections shown in the diagrams of each phase winding in Fig. 1.

It is, of course, understood that any suitable form of cooperating secondary or field winding such as a salient pole direct-current rotor, a squirrel cage rotor or a wound rotor may be utilized to render the dynamo-electric machine complete, but since such windings and structures are well known, it is not considered essential or necessary to describe them in any further detail.

In Fig. 2 of the drawing, I have diagrammatically represented a two-layer lap winding for a four pole, two circuit, three phase alternator having 72 slots with fractional pitch coils of ⅔ pitch. For purposes of simplicity I have shown only one phase of the two corresponding circuits, namely, phase A and phase $a$, but it will be apparent to those skilled in the art that the remaining phases namely B and $b$, and C and $c$ will be arranged in the stator core in a similar manner. In winding arrangements using a coil pitch of the order of ⅔ pitch it is satisfactory to alternate the order of coil sides in alternate phase belts and then repeat the same sequence every two poles. Thus with the three phases A, B, and C and the three phases $a$, $b$, and $c$, each having three slots per pole per phase per circuit and ⅔ pitch, the distribution of the phases in successive slots, using for simplicity one letter of the corresponding phase to represent coil sides of one half a phase belt, is as follows:

Top layer—$AabBCcaABbcCAabBCcaABbcC$
Bottom layer—$BbcCAabBCcaABbcCAabBCcaA$

It will thus be observed that on the top layer the order of coil sides from the first phase belt toward the left, as viewed in the drawing is "capital letter" circuit, "lower case" letter circuit, in the next phase belt the order is reversed, namely, "lower case" letter circuit, "capital letter" circuit, and so on, alternately, for two poles. The same order of coil sides is repeated for the next two poles or for the remaining poles in groups of two as the case may be. Similarly in the bottom layer the order of coil sides of the two circuits is reversed in alternate phase belts. The distribution of phases in successive slots for the complete winding is indicated in detail at the bottom of Fig. 2 by the respective phase letter designations.

In Fig. 3 of the drawing I have shown an embodiment of my invention in a sectionalized bus system, in which 74 indicates a portion of a station bus which may be of the ring or chain type in a single or duplicate busbar system. For purposes of simplicity a one line diagrammatic representation has been used to illustrate all of the circuits except the armature and field windings of the generators. The bus 74 may comprise any number of sections but for purposes of illustration I have shown three sections 75, 76 and 77. Feeders 78, 79 and 80, and 81 are connected respectively to the bus sections 75, 76 and 77. The respective bus sections have interposed therebetween suitable bus sectionalizing switches 82 which under the usual conditions of operation are maintained in the circuit interrupting position and are moved to the circuit closing position only when it is desirable to connect the bus sections directly together. In accordance with my invention relative to the system of busbar sectionalization, the bus sections 75 and 76, and 76 and 77 are interconnected by double winding generators 83 of the type shown in Figs. 1 and 2. Each generator has one winding thereof connected to two different bus sections and the other two windings are connected to the same bus section. The respective generator windings are connected to the associated bus sections through suitable switches 84. Each generator is also provided with a field or excitation circuit indicated diagrammatically by the windings 85 and batteries 86.

With this arrangement, the several bus sections are synchronized and tied together through the two windings of the individual generator. The reactance introduced between bus sections is the self-inductive reactance of the generator windings. Furthermore, with different generator windings tied together by the same bus section, the generators may be synchronized through a lower included reactance than is possible with the usual sectionalizing reactors.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a dynamo-electric machine having a slotted magnetic member, a winding for said magnetic member having $n$ electrically independent similar phase circuits under every pole with all coils of equal pitch and all the coil sides of the respective circuits in the same layer of each phase belt arranged in different groups of adjacent slots for substantially $1/n$th of a phase belt.

2. In a dynamo-electric machine having a slotted magnetic member, a winding for said magnetic member, having two electrically independent similar phase circuits under every pole with all coils of equal pitch and all the coil sides of the respective circuits in the same layer of each phase belt arranged in different groups of adjacent slots for substantially one half of a phase belt.

3. In a dynamo-electric machine having a slotted magnetic member, a winding for said magnetic member having $n$ electrically independent similar phase circuits with all coils of equal pitch and all the coil sides of the respective circuits in the same layer of each phase belt arranged in different groups of adjacent slots for substantially $1/n$th of a phase belt and having the order of assignment of the successive fractional phase belts to the several phase circuits changed at predetermined intervals around the periphery of said magnetic member.

4. In a dynamo-electric machine having a slotted magnetic member, a winding for said magnetic member having $n$ electrically independent similar phase circuits with all the coil sides of the respective circuits in the same layer of each phase belt arranged in adjacent slots for $1/n$th of a phase belt and having the order of assignment of the successive fractional phase belts to predetermined phase circuits changed under predetermined poles.

5. In a dynamo-electric machine having a slotted magnetic member, a winding for said magnetic member having two electrically independent similar phase circuits with all coils of equal pitch and coil sides of each circuit in each phase belt arranged in adjacent slots for one half of a phase belt and having the circumferential order of succession of half phase belts of similar phase circuits reversed at predetermined intervals around the periphery of said slotted magnetic member.

6. In a dynamo-electric machine having a slotted core magnetic member, a winding for said magnetic member having two electrically independent similar phase circuits under every pole with coil sides of each circuit in each phase belt arranged in adjacent slots for one half of a phase belt and having the order of succession of half phase belts of predetermined similar phase circuits reversed under every succeeding pole proceeding in a predetermined direction of progression around the periphery of said magnetic member.

7. In an alternating current dynamo-electric machine, the combination with a slotted armature core, a winding mounted on said armature core having two electrically independent circuits for each phase under every pole with coil sides of each circuit in each phase belt arranged in adjacent slots for one half of a phase belt and having the order of succession of half phase belts of similar phase circuits in two different phase belts reversed every two phase belts around the periphery of said armature core.

8. In a dynamo-electric machine having a slotted magnetic member, a winding for said magnetic member comprising a series of coils of the same pitch having a plurality of electrically independent similar circuits per phase with coil sides of the respective circuits included in each phase belt and arranged in different groups of adjacent slots, the coil sides in each of said group of slots being connected respectively in a different one of said plurality of circuits.

9. In a dynamo-electric machine having a slotted magnetic member, a winding for said magnetic member comprising a series of coils of the same pitch having a plurality of electrically independent similar circuits per phase with coil sides of the respective circuits included in each phase belt and arranged in different groups of adjacent slots, the coil sides in each of said groups of slots being connected respectively in a different one of said plurality of circuits, and having the order of assignment of the successive fractional phase belts to the several phase circuits changed at predetermined intervals around the periphery of said magnetic member.

10. In a dynamo-electric machine having a slotted magnetic member, a three-phase winding for said magnetic member, each phase comprising two electrically independent similar phase circuits under every pole with coil sides of each circuit assigned to groups of adjacent slots alternately and having the order of circuits reversed three times every two poles.

11. In a dynamo-electric machine having a slotted magnetic member, a three-phase winding for said magnetic member, each phase comprising two electrically independent similar phase circuits under every pole with coil sides of each circuit assigned to groups of adjacent slots alternately and having the order of circuits reversed three times per pole.

12. A polyphase synchronous dynamo-electric machine having two winding groups of in-phase generated voltages, arranged in alternate groups of slots, at least half of the slot groups comprising more than two slots, the coil-throw of the winding being approximately ⅚ pitch.

13. A dynamo-electric machine having two winding groups of in-phase generated voltages, arranged in alternate groups of slots, at least half of the slot groups comprising more than two slots.

14. A polyphase dynamo-electric machine having two winding groups of in-phase generated voltages, arranged in alternate groups of slots, each of the slot groups comprising more than two slots, the coil-throw of the winding being between ⅔ pitch and $\tfrac{9}{10}$ pitch.

15. An electrical system comprising a plurality of bus-sections and a plurality of polyphase generators including a two-winding generator having its two windings connected to two different bus-sections, at least some of the bus-sections being connected to windings of at least two different generators, characterized by the fact that said two-winding generator is a polyphase synchonous dynamo-electric machine having two winding groups of in-phase generated voltages, arranged in alternate groups of slots, at least half of the slot groups comprising more than two slots, the coil throw of the winding being approximately ⅝ pitch.

PHILIP L. ALGER.